United States Patent [19]

Terasaka et al.

[11] Patent Number: 5,356,732
[45] Date of Patent: Oct. 18, 1994

[54] ALKALINE STORAGE CELL ACTIVATION METHOD

[75] Inventors: Masayuki Terasaka, Tsuna; Masaki Higuchi; Kenji Arisawa, both of Sumoto, all of Japan

[73] Assignee: Sanyo Electric Co., Ltd., Osaka, Japan

[21] Appl. No.: 68,050

[22] Filed: May 28, 1993

[30] Foreign Application Priority Data

May 29, 1992 [JP] Japan .................. 4-139448
Sep. 30, 1992 [JP] Japan .................. 4-262484
Nov. 25, 1992 [JP] Japan .................. 4-315136

[51] Int. Cl.⁵ .......................... H01M 10/44
[52] U.S. Cl. .......................... 429/52; 320/21
[58] Field of Search ............ 429/50, 52; 320/21, 320/29

[56] References Cited

U.S. PATENT DOCUMENTS 4,661,759 4/1987 Klein .................. 320/21 X
4,680,241 7/1987 Dyer .................. 429/52 X
5,100,745 3/1992 Earl .................. 429/50 X

FOREIGN PATENT DOCUMENTS 53-51449 5/1978 Japan .
64-21864 1/1989 Japan .
4-94058 3/1992 Japan .
4-109557 4/1992 Japan .

Primary Examiner—Stephen Kalafut
Attorney, Agent, or Firm—Armstrong, Westerman, Hattori, McLeland & Naughton

[57] ABSTRACT

The present invention discloses a method for activating an alkaline storage cell comprising a non-sintered type nickel positive electrode comprised of a metallic cobalt powder. The method comprises a first step for fabricating the alkaline storage cell, a second step for charging the fabricated storage cell is charged with the charging amount of 1000 mAH or lower than the same per 1 g of the metallic cobalt powder included in the positive electrode, a third step for resting the charged storage cell, and a fourth step for applying an initial charging-/discharging operation is applied to the storage cell which was rested at the third step.

6 Claims, 4 Drawing Sheets

ALKALINE STORAGE CELL ACTIVATION METHOD

BACKGROUND OF THE INVENTION

1. Field of the Invention

The present invention relates to a method for activating an alkaline storage cell which comprises a non-sintered type nickel positive electrode so as to improve the utilization of active material comprised of metallic cobalt powder.

2. Description of the Related Art

Recently, a non-sintered type nickel positive electrode comprising a core material to which a pasty active material is loaded has been widely used. Compared to the conventional sintered type nickel positive electrode, the non-sintered type nickel positive electrode has the advantages of simple production process, low production costs and attainment of high energy density.

In the non-sintered type nickel positive electrode, a high porous nickel substrate possessing the porosity of higher than 95% such as a sponge type nickel or a felt type nickel is employed as the electrically conductive core material. Further, an electrically conductive powder such as a cobalt compound powder is fixed in the active material so that electrical conductivity among the active material particles away from the nickel substrate increases. Consequently, the utilization of the active material improves. Particularly, as disclosed in Japanese Laid-open Patent Application No. 53-51449, metallic cobalt is known to improve the utilization owing to its electrically conductive characteristics. Also, at charging, the metallic cobalt is converted into the cobalt oxyhydroxide according to Formulae 2 and hereinafter 3, which is superior in electrical conductivity, and hence conductivity among the active material particles further increases.

Actually, owing to the metallic cobalt fixed in the cathode, the utilization of the nickel active material improves; and the cell capacity will improve. The improvement of the cell capacity, however, will not be sufficient only by fixing the metallic cobalt in the cathode. According to the alkaline storage cell disclosed in Japanese Laid-open Patent Application No. 64-21864, for example, the current at the initial state of the charging is suppressed so that oxidation of the metallic cobalt is given the highest priority.

This method, however, still fails to obtain the oxidation of the metallic cobalt which is smooth enough to improve utilization of the metallic cobalt; and hence the energy density of the cell has not improved as much as expected.

SUMMARY OF THE INVENTION

Accordingly it is a primary object of the present invention to provide a method for improving utilization of the active material by obtaining smooth oxidation of the metallic cobalt powder; thereby energy density of the cell, represented by the cell capacity, will improve.

This object may be fulfilled by the method comprising four steps: a first step at which an alkaline storage cell is fabricated using a non-sintered type nickel positive electrode comprised of metallic cobalt powder; a second step at which the alkaline storage cell obtained at the first step is charged limitedly so that it is charged with the amount of 1000 mAH per 1 g of the metallic cobalt powder included in the positive electrode; a third step at which the alkaline storage cell charged at the second step is rested; and a fourth step at which the alkaline storage cell is subjected to an initial charging/discharging operation.

The activation method in the present invention improves utilization of the nickel active material by encouraging oxidation of the metallic cobalt powder applied to the nickel positive electrode. Applying this method to the alkaline storage cell including the pasty nickel positive electrode, capacity thereof will improve significantly.

The reasons the cell capacity improves will be described. When the alkaline storage cell comprising the non-sintered type nickel positive electrode comprised of metallic cobalt is charged, material inside of the positive electrode is converted according to Formulae 1–3.

FORMULA 1

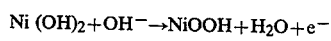

$$Ni(OH)_2 + OH^- \rightarrow NiOOH + H_2O + e^-$$

FORMULA 2

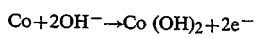

$$Co + 2OH^- \rightarrow Co(OH)_2 + 2e^-$$

FORMULA 3

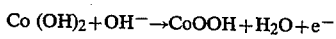

$$Co(OH)_2 + OH^- \rightarrow CoOOH + H_2O + e^-$$

As apparent in the above formulae, $OH^-$ ions in electrolyte are essential for oxidation of the metallic cobalt. The cobalt oxyhydroxide produced at charging, however, creates an cobalt oxyhydroxide barrier which prevents the metallic cobalt inside of the metallic cobalt particle from being exposed to the $OH^-$ ions in the electrolyte. Consequently, the metallic cobalt will not be supplied with the $OH^-$ ions when the surface of the particle is fully converted with the cobalt oxyhydroxide barrier, hindering oxidization thereof as well as putting the metallic cobalt particle into the so-called passive state.

In order to improve the utilization of the metallic cobalt, smooth oxidation thereof into the cobalt hydroxide is crucial; since smooth oxidation of the cobalt hydroxide into the cobalt oxyhydroxide is more likely than smooth oxidation of the metallic cobalt into the cobalt hydroxide, and hence the success of the oxidation of the metallic cobalt into the cobalt oxyhydroxide heavily relies on the success of the former oxidation.

The method disclosed in Japanese Laid-open Patent Application No. 64-21864 has not overcome the coverage of the metallic cobalt particle with the cobalt oxyhydroxide barrier. That is, the cobalt oxyhydroxide preferentially converted from the metallic cobalt forms the cobalt oxyhydroxide barrier on the surface of the metallic cobalt particle thereby preventing the metallic cobalt inside of the metallic cobalt particle from being exposed to $OH^-$ ions in the electrolyte. Consequently, further oxidation of the metallic cobalt is hindered.

Accordingly, the method disclosed in the present invention ensures smooth oxidation of the metallic cobalt by combining chemical oxidation and electrochemical oxidation; and hence the utilization of the active material will improve significantly.

(1) The storage cell fabricated at the first step is subjected to the limited charging formation; thereby the pasty nickel active material and the metallic cobalt included in the positive electrode are electrochemically converted into the nickel oxyhydroxide and the cobalt oxyhydroxide respectively in accordance with the above Formulae 1-3. The metallic cobalt was charged with 1000 mAH per 1 g or lower than the same at the limited charging formation, so that the cobalt oxyhydroxide will not cover the whole surface of the metallic cobalt particle; and hence the metallic cobalt will not be put into the passive state.

Kept at rest during the rest period, the nickel oxyhydroxide and the cobalt oxyhydroxide are reduced into the nickel hydroxide and the cobalt hydroxide respectively thereby helping oxidation of the metallic cobalt inside of the metallic cobalt particle as oxidant agents concurrently. This oxidation-reduction reaction occurs according to Formulae 4, 5, and 2.

FORMULA 4

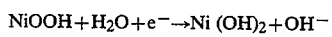

$NiOOH + H_2O + e^- \rightarrow Ni(OH)_2 + OH^-$

FORMULA 5

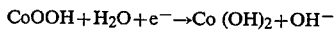

$CoOOH + H_2O + e^- \rightarrow Co(OH)_2 + OH^-$

Establishment of the rest period improves utilization of the metallic cobalt at the positive electrode. That is, at charging, the metallic cobalt is supplied with $OH^-$ ions and oxidation thereof forms the cobalt hydroxide on surface of the metallic cobalt particle. Different from the cobalt oxyhydroxide and the metallic cobalt, the cobalt hydroxide has dissolution potential. Therefore, during the rest period it will be dissolved into the electrolyte. Since the cobalt hydroxide forming the cobalt oxyhydroxide barrier on surface of the metallic cobalt particle is removed therefrom, the metallic cobalt inside of the particle will be exposed to the electrolyte and will be oxidized when it is charged. Subsequently, the cobalt hydroxide dissolved into the electrolyte is disposed at the positive electrode as the cobalt oxyhydroxide which is superior in its conductivity.

The initial charging/discharging operation (conditioning) is applied to the cell. This conditioning follows the limited charging formation at the second step and the, rest period at the third step so that the cell capacity improves owing to the smooth oxidation of the metallic cobalt. Without placing the second step and the third step before the conditioning, however, the metallic cobalt particle will be fully covered with the cobalt oxyhydroxide thereby putting it into the passive state.

(2) Proper rest period improves the utilization of the active material. With insufficient rest period, on the other hand, the metallic cobalt will be put into the passive state. In this case, part of the cobalt oxyhydroxide formed at the second step remains on surface of the metallic cobalt particle; eventually the cobalt oxyhydroxide will cover the whole surface of the metallic cobalt at charging with putting it into the passive state.

Accordingly, the present invention discloses the rest period which lasts until the cell potential of the positive electrode drops to the equilibrium potential of $Co/Co(OH)_2$; thereby the oxidation-reduction reaction in the Formulae 2, 4, 5 as well as oxidation of the metallic cobalt will advance smoothly.

The equilibrium potential of $Co/Co(OH)_2$ is described in Formula 6. In many cases, however, the equilibrium potential becomes a mixed electrode potential by including potentials besides the one in Formula 6, and hence it is hardly determined. In order to obtain proper rest period based on the equilibrium potential, potential of the positive electrode obtained when it becomes stable is considered to be the equilibrium potential herein.

FORMULA 6

$Co + 2OH^- \rightleftharpoons Co(OH)_2 + 2e^-$

Table 1 shows the equilibrium potential obtained for each type of alkaline storage cell. When employing the storage cells in Table 1, they will be rested until the cell potential drops to the equilibrium potential in Table 1. Consequently, the utilization of the active material will improve.

TABLE 1

| sort of storage cell | cell potential (V) |
|---|---|
| nickel-cadmium | 0.05-0.15 |
| nickel-hydrogen | 0.05-0.15 |
| nickel-iron | 0.15-0.22 |
| nickel-zinc | 0.50-0.60 |

(3) Repetition of the activation cycle comprising the limited charging formation (second step) and the rest period (third step) will further improve the utilization of the active material, since part of the metallic cobalt powder left unconverted at the first cycle will be oxidized at following cycles. Consequently, smooth oxidation of the metallic cobalt will be encouraged.

(4) Generally, charge capacity of the negative electrode is made larger than charge capacity of the positive electrode in a sealed type alkaline storage cell; thereby the negative electrode holds a portion left uncharged when charging formation of the positive electrode is completed, referred to as charge reserve; while the negative electrode holds a charged portion when discharging of the negative electrode is completed, referred to as discharge reserve.

Owing to the charge reserve, at charging the oxygen gas is generated preferentially, and the oxygen gas is consumed into the negative electrode. Consequently, the generation of the hydrogen gas at the negative electrode can be prevented. Similarly, owing to the discharge reserve, overdischarge of the negative electrode is prevented since capacity of the cell is controlled by capacity of the positive electrode, which is referred to as positive electrode domination. Consequently, reduction of the negative electrode utilization will be prevented.

According to Japanese Laid-open Patent Application No. 64-21864, the charge reserve and the discharge reserve vary in accordance with composition of the active material as well as with the activation method applied to the cell. To be concrete for the present invention, the cobalt oxyhydroxide generated at charging of the cell is not reduced at discharging. Consequently, charge taken into the positive electrode to convert the metallic cobalt into the cobalt oxyhydroxide will not be consumed at discharging; and hence the discharge reserve of the negative electrode increases by this charge. On the other hand, the discharge reserve increases at oxidization of the metallic cobalt; thereby the charge reserve decreases, which may possibly cause generation of the hydrogen. The generation of the hydrogen can be prevented by controlling total charging amount which comprises charging amount employed to charge the negative electrode at fabrication of the cell (the positive electrode at full discharging ) and charging amount employed at the limited charging formation.

It was found in an experiment described later that 5–30% of the total charging amount to theoretical capacity of the negative electrode prevents either the charge reserve or the discharge reserve from decreasing excessively. Therefore, making the total charging amount 5–30% of the theoretical capacity, utilization of the active material improves by keeping a balance between the charge reserve and the discharge reserve as well as excluding distortion of the cell characteristics.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Figure 1:
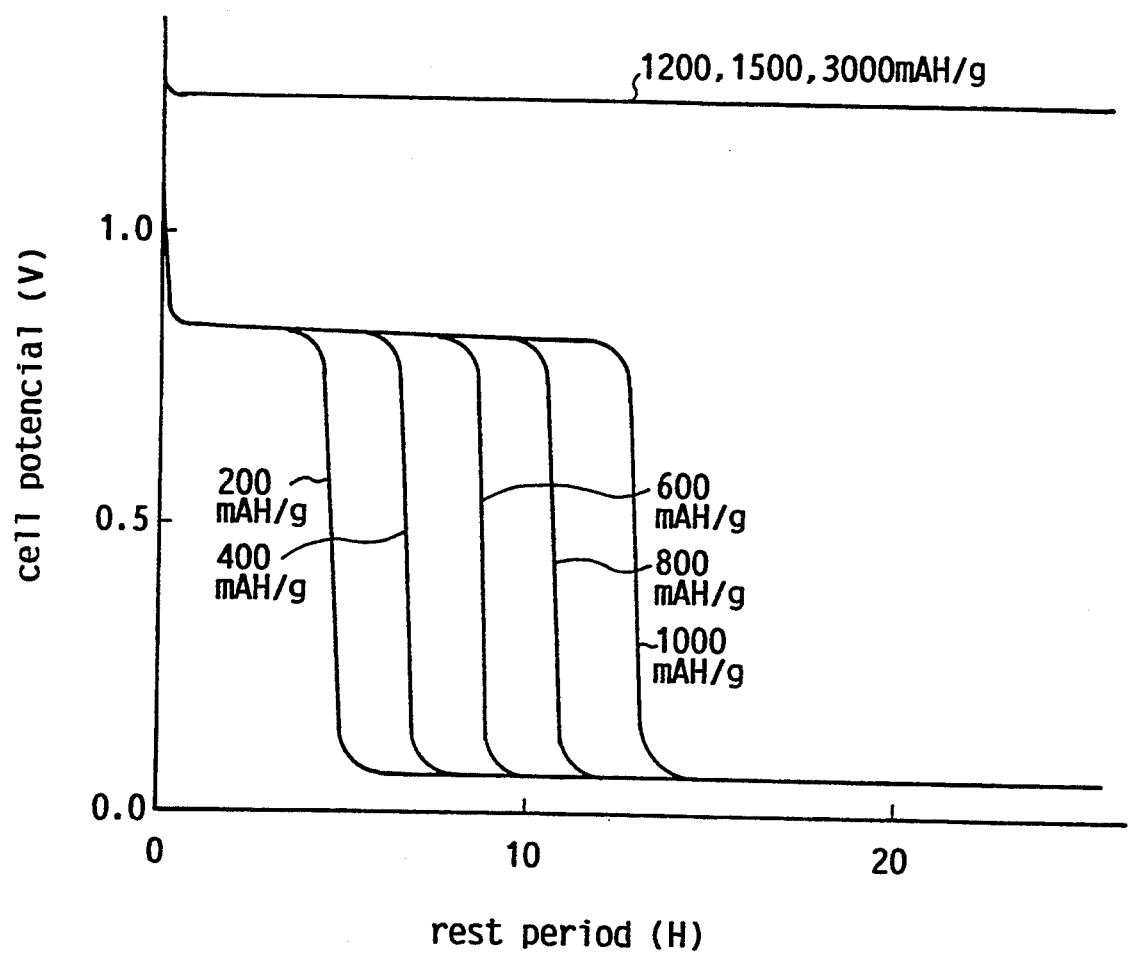
FIG. 1 is a graph showing fluctuation in cell potential of cells during rest period, the cells differing from each other in charging amount applied thereto at limited charging formation.

Production of a Storage Cell (1) Production of a Positive Electrode

A 50 weight percentage (wt %) solution of methyl cellulose was added to 90 wt % of a nickel hydroxide powder having an average particle size of about 10 $\mu$m (Fischer sub-sieve sizer size) and 10 wt % of a metallic cobalt powder having an average particle size of about 1.5 $\mu$m, followed by kneading to obtain a paste. This paste was loaded on an electrically conductive support comprising a sponge type nickel having an average pore diameter of about 150 $\mu$m and dried. Then PTFE dispersion was applied to the sponge type nickel loaded in active material and dried to obtain a non-sintered type positive electrode of about 0.5 mm thick.

(2) Production of an Negative Electrode (i) A 25 wt % solution of methyl cellulose was added to 90 wt % of cadmium hydroxide and 10 wt% of metallic cadmium, followed by kneading to obtain a paste. This paste was coated on a punching metal sheet and dried to obtain an electrode. Then, this electrode was subjected to charging formation with a current of 0.25 C to 150% of theoretical capacity in an alkaline solution, then to discharging with a loading of resistance corresponding to a current of 0.25 C. The electrode was rinsed and dried to obtain a non-sintered type cadmium negative electrode, which will be referred to as F0 hereinafter.

(ii) Other negative electrodes F2, F5, F10, F25, F30, F40, F50 were prepared in the same manner as in (i) except that the electrodes were charged with a current of 1 C to 2%, 5%, 10%, 20%, 25%, 30%, 40%, 50% of theoretical capacity respectively, followed by rinsing and drying.

Thus, the charging formation was applied to the negative electrode before fabrication of the alkaline storage cell; and the number accompanied by F represents a ratio of the potential applied to the negative electrode to theoretical cell capacity thereof.

(3) Fabrication of Cell

A sealed type nickel cadmium storage cell was fabricated using the positive electrode and the negative electrode obtained in (1) and (2) respectively. To be precise, the nickel positive electrode and the cadmium negative electrode were coiled together by way of a separator in order to obtain an electrode group, which was disposed inside of an external container. The upper opening of the external container was sealed after it was added with electrolyte of an aqueous potassium hydroxide; thereby a cell with a nominal capacity of 1.2 AH or 1.5 AH Was fabricated with F0 while a cell with a nominal capacity of 1.1 AH was fabricated with the negative electrode other than F0 (JIS. KR-A size).

It was considered that the fabrication of the cell was completed when the cell was added with electrolyte; and limited charging formation, different from the one applied to the negative electrode before fabrication, was applied to the fabricated cell.

EXPERIMENT 1

Ten sorts of cells using the negative electrode obtained in (2) were employed. They differ in ratio of ampere hour capacity to weight of the metallic cobalt powder, though all of them were charged at 1 C (1.2 AH). To be concrete, each of the cells was charged with charging amount of 0 mAH, 200mAH, 400 mAH, 600 mAH, 800 mAH, 1000 mAH, 1200 mAH, 1500 mAH, 2000 mAH, and 3000 mAH per 1 g of the metallic cobalt. Charging with 0 m AH/g means that no charging formation was applied thereto.

Next, these ten samples of cells were rested; and a relation between the rest period and the cell potential was examined for each cell.

Concurrently, a relation between a charging amount applied to the fabricated cell at limited charging formation and the cell capacity as well as a relation between the rest period and the cell capacity were examined. One set of them were rested for an hour (cell group A) while the other set were rested for 24 hours (cell group B); then the cells in both groups were charged with a current of 0.1 C to 160% of nominal capacity, and were discharged with a loading of resistance corresponding to a current of 1 C to the discharge ending potential of 0.8 V.

FIG. 1 shows fluctuation in the potential during the rest period for each cell. As apparent from the figure, fluctuation in the cell potential during the rest period was influenced by the charging amount employed at limited charging formation.

To be precise, the potential in the cells charged with 200–1000 mAH started dropping at beginning of the rest period and became stable about 1.0 V. After a while, the potential started dropping drastically and become stable at 0.1 V, which is the equilibrium potential of Co/Co(OH)$_2$. The drop of the potential to 0.1 V took different rest periods among the cells charged with different charging amounts. That is, when the charging amount at limited charging formation increases, the rest period required to obtain the equilibrium potential became longer.

The cells applied with 1200 mAH or higher than the same (1200-3000 mAH/g) did not drop to 0.1 V even after 24-hour rest period.

A relation between the charging amount at limited charging formation and the cell capacity will be described with reference to FIG. 2. In the figure each cell capacity is represented by a ratio thereof to cell capacity of the cell to which no potential was applied (0 mAH/g)).

As apparent from the figure, the cell capacity was influenced by the charging amount at limited charging formation. To be precise, the cell capacity of the cells both in the groups A and B improved if they had been charged with 1000 mAH/g or lower than the same; however, the cell capacity of the cell charged with higher than 1000 mAH/g remained the same as the cell capacity of the cell charged with 0 mAh/g.

Further, cell capacity of the cells in group B improved more than the cells in group A. That is, the cell capacity improved more when the cells were rested for 24 hours than were rested for an hour.

Thus, it was found in Experiment 1 that the cell capacity improved significantly when the cell was charged with 1000 mAH/g or lower than the same and was rested for a while. Also it was found that cell capacity of the cells having different rest periods improved differently from each other.

EXPERIMENT 2

The influence of the rest period on improvement of the cell capacity, which was found in Experiment 1, was further examined in detail.

The cells were fabricated using the negative electrode F0 and were subjected to the limited charging formation. To be precise, the cells were charged at a current of 1 C with 600 mAH per 1 g of the metallic cobalt. Then, the cells were rested for different rest periods. To be precise, each of the cells was rested for an hour, 3 hours, 5 hours, 7 hours, 10 hours, 15 hours, and 24 hours. After each of the rest periods, the cells were charged with a current of 0.1 C to 160% of nominal capacity, then discharged with a loading of resistance corresponding to a current of 1 C to the discharge ending potential of 0.8 V.

Figure 2:
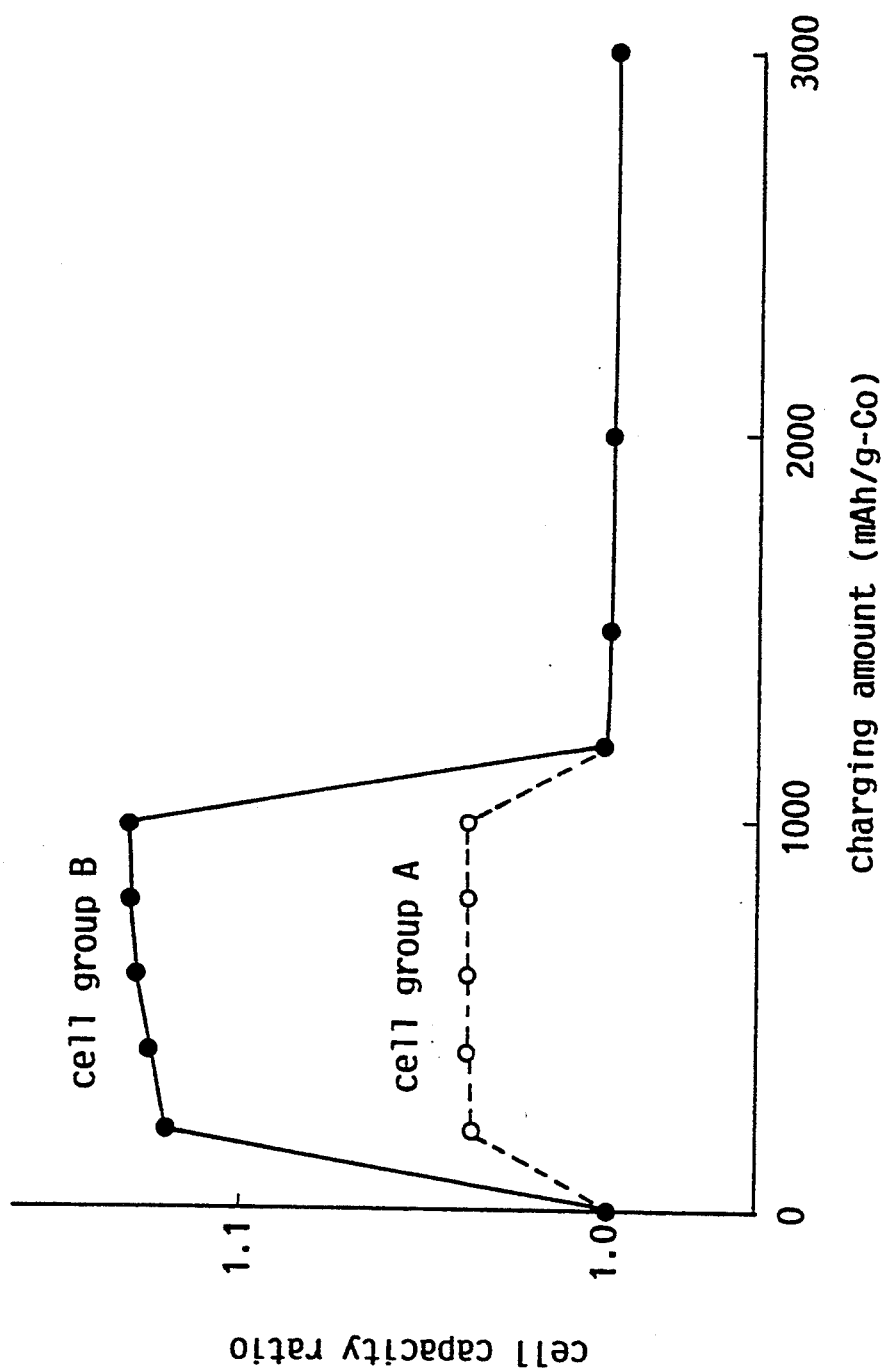
FIG. 2 is a graph showing a relation between charging amount applied to two cell groups at charging and cell capacity, the cell groups differing from each other in length of rest period.
Figure 3:
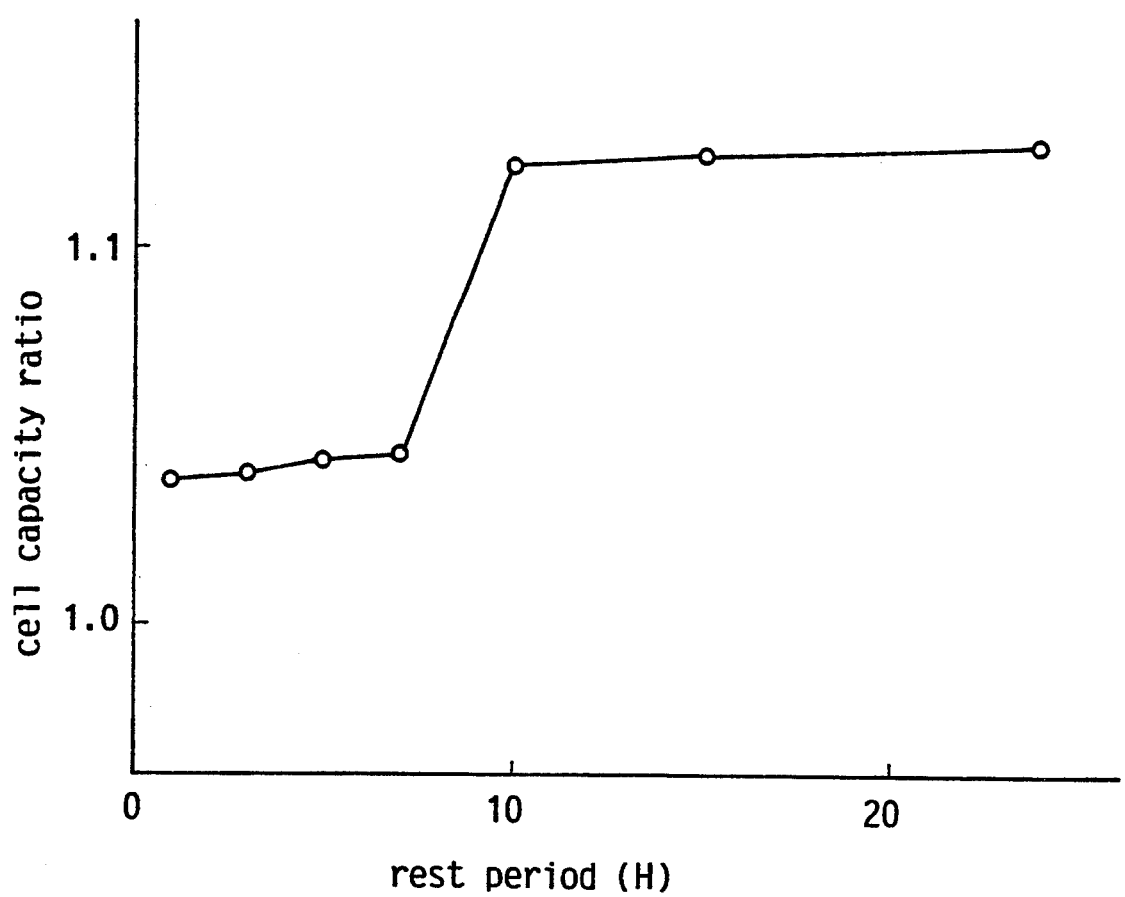
FIG. 3 is a graph showing fluctuation in cell capacity during rest period.

Fluctuation in the cell capacity during the rest period will be described with reference to FIG. 3, wherein the cell capacity, as in FIG. 2, is shown by its ratio to the cell capacity of the cell charged with 0 mAH/g. As apparent from the figure, the rest period influenced the cell capacity. To be precise, the cell capacity started increasing rapidly when the rest period lasted 9 hours. This coincides with the point when the cell capacity of the cell charged with 600 mAH/g started dropping, from 0.8 into 0.1 V in FIG. 1. From these findings it was apparent that improvement of the cell capacity was mainly caused by the cell potential of 0.1 V, which was equivalent to the equilibrium potential of $Co/Co(OH)_2$.

Concluding about results of Experiments 1 and 2, the preferable charging amount employed at limited charging formation was 1000 mAH/g or lower than the same as well as the preferable rest period lasted until the cell potential became equivalent to the equilibrium potential of $Co/Co(OH)_2$.

EXPERIMENT 3

From Experiments 1 and 2, the preferable charging amount at limited charging formation and the preferable rest period were detected, which will be employed in an activation cycle hereinafter. In Experiment 3, a relation between the number of the cycles and the cell capacity was examined.

Experimental Cell

The sealed nickel-cadmium storage cell was fabricated using the negative electrode F0, and was subjected to the limited charging formation. To be precise, the cell was charged at 1 C (1.2 AH) with 1000 mAH per 1 g of the metallic cobalt powder, then it was rested for 24 hours; and hence the cell potential became equivalent to the equilibrium potential of $Co/Co(OH)_2$, +0.1 V. Two experimental cells were fabricated, differing from each other in the number of the activation cycles. That is, one cycle of the activation was provided to a cell (a1), while two cycles of the activation were provided to a cell (a2).

Comparative Cell

A comparative cell (X) was fabricated, which was the same as each of the experimental cells except in that none of the activation cycle was provided thereto.

Experimental Condition

The experimental cells (a1) and (a2) as well as the comparative cell (X) were charged at 0.1 C for 16 hours; then were discharged with loading of resistance corresponding to a current of 1 C; and the cell capacity at discharging was measured among those three cells.

Result

As shown in Table 2, the number of the cycles influenced the cell capacity. To be precise, the cell capacity of the cell (a1) was larger than (X) but smaller than (a2). From this it was found that repetition of the activation cycle improved the cell capacity, causing improvement of the utilization of the active material.

TABLE 2

| cell | cell capacity (mAH) |
|------|---------------------|
| a1   | 1310                |
| a2   | 1325                |
| X    | 1200                |

EXPERIMENT 4

Utilizing results from Experiments 1-3, the preferable condition was further examined.

Experimental Condition

In the activation cycle, the limited charging formation and the rest period were considered as a step A and a step B respectively; and experimental condition was created by varying conditions both at the step A and the second step B. To be concrete, at the step A the cells were charged with 500 mAH, 1000 mAH, and 1100 mAH per 1 g of the metallic cobalt. At the step B, 3 hour rest period and 24 hour rest period were applied to each of the cells. Then, fluctuation in the cell capacity along repetition of the cycle from up to the 6th cycle was examined.

The cells were fabricated in the same manner as the experimental cells in Experiment 3, and the activation cycle comprising the step A and the step B was repeated under the same condition. The cell capacity of the cells at discharging was examined.

Result

Figure 4:
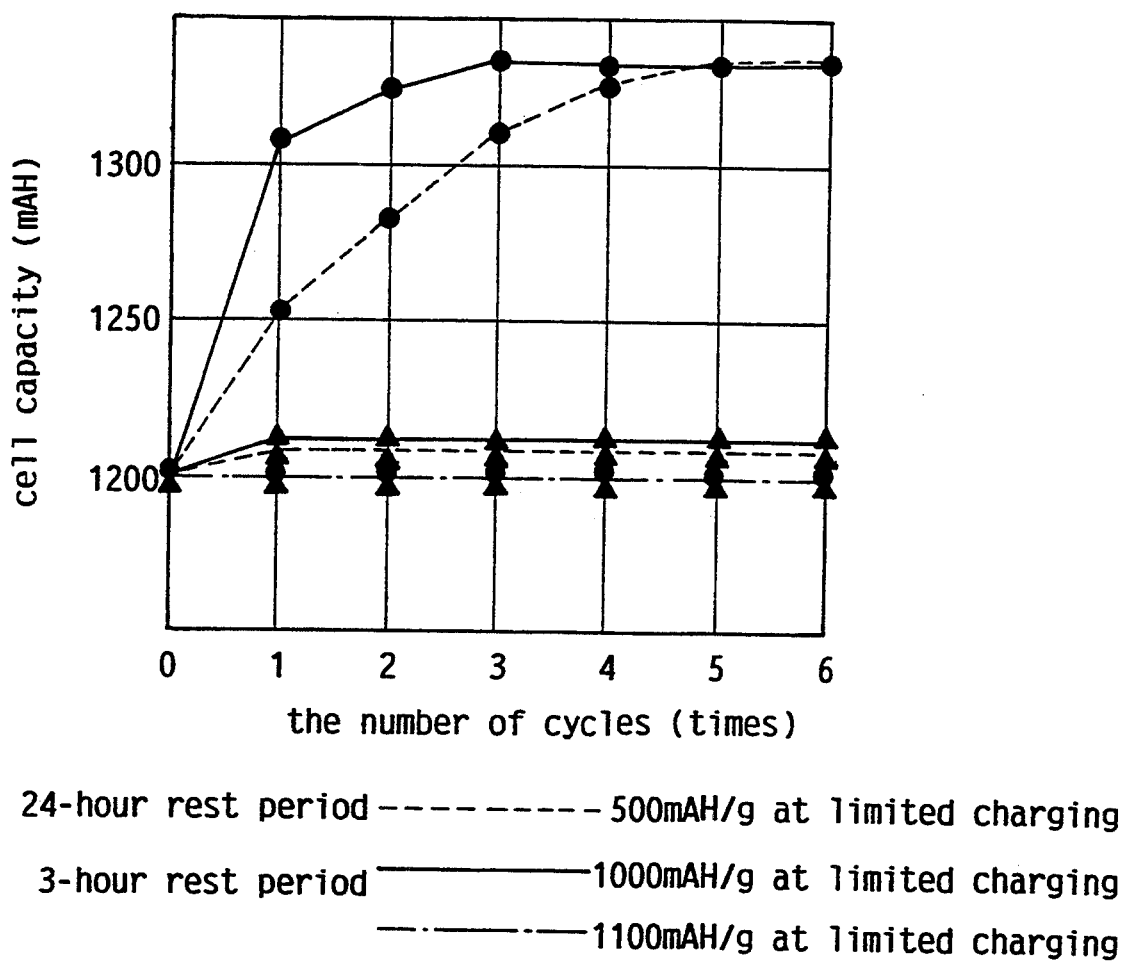
FIG. 4 is a graph showing a relation among charging amount applied to a cell at limited charging formation, rest period, the number of treatment cycles, and cell capacity.

1) As was apparent from FIG. 4, the cell capacity charged with 1100 mAH/g at limited charging formation did not fluctuate regardless variation in the rest period or the cycle repetition. Also in this case, the cell potential did not become equivalent to the equilibrium potential of Co/Co (OH)$_2$ even after the 24 hour rest period (not illustrated in the figure).

This finding was consistent with the result of the experiments 1 and 2; and it was considered that this result was caused by failure of the smooth oxidation of the metallic cobalt. That is, charged with high charging amount at limited charging formation, the metallic cobalt powder was converted into the cobalt hydroxide too quickly, resulting into the full coverage of the metallic cobalt particle with the cobalt oxyhydroxide barrier. Consequently, the metallic cobalt was put into the passive state, which hindered the oxidation of the metallic cobalt inside thereof by preventing it from being exposed to the electrolyte. Because of the metallic cobalt put into the passive state, no improvement of the cell capacity was observed.

2) As shown in FIG. 4, the cell capacity of the cell charged with 500 mAH/g did not fluctuate even at the end of the second cycle when it was rested for 3 hours at the step B. Also in this case the cell potential did not drop to the equilibrium potential of Co/Co (OH)$_2$ after the rest period (not illustrated in the figure).

On the other hand, when the cell charged with 500 mAH/g was rested for 24 hours at the step B, the cell capacity thereof improved along repetition of the cycle up to the fifth cycle. In this case the cell potential dropped to the equilibrium potential of Co/Co (OH)$_2$.

From these findings, it was considered that if the rest period was only 3 hours, the cobalt oxyhydroxide barriers remained at the surface of the metallic cobalt particle even at the limited charging formation of the following activation cycle, so that the metallic cobalt was put into the passive state. Consequently, oxidation of the metallic powder at charging was hindered, resulting in no improvement of the cell capacity. Within the 24 hour rest period, however, the cobalt oxyhydroxide created on the surface of the metallic cobalt particle stimulated oxidation of the metallic cobalt inside thereof as well as being reduced into the cobalt hydroxide itself. Subsequently, the cobalt hydroxide was dissolved into the electrolyte, so that the metallic cobalt inside of the metallic cobalt particle was exposed to the electrolyte. Thus, oxidation of the metallic cobalt was encouraged along repetition of the activation cycle (the step A and the step B), resulting in improvement of the cell capacity.

The improvement of the cell capacity, however, did not last further than the fifth cycle. This is explained by decrease in the metallic cobalt as well as increase in the cobalt oxyhydroxide along with repetition of the activation cycle, the metallic cobalt being subjected to the oxidization while the cobalt oxyhydroxide being oxidizing agent. That is, along with repetition of the cycle, the formation of the cobalt oxyhydroxide barrier putting the metallic cobalt into the passive state became more likely; and at end of the fifth cycle it was eventually formed, hindering improvement of the cell capacity thereafter.

The metallic cobalt in the passive state did not cause the, reaction in the above Formula 6; and hence the cell potential did not drop to the equilibrium potential of Co/Co (OH)$_2$.

3) As shown in FIG. 4, when the cell was charged with 1000 mAH/g at the step A and was rested for 3 hours at the step B, the cell potential did not drop to the equilibrium potential (not illustrated) as well as the cell capacity did not improve. When the rest period was extended to 24 hours, however, the cell capacity improved along repetition of the cycles up to the third cycle.

These findings were explained by the same causes as in 2).

From the results in Experiment 4, the preferable condition deducted from the previous experiments was supported. That is, in order to improve the utilization of the active material, the charging amount at limited charging formation should be lower than 1000 mAH/g; and the cell should be rested long enough so that the cell potential will drop to the equilibrium potential of Co/Co (OH)$_2$.

EXPERIMENT 5

The preferable activation condition was further examined by balancing the charging reserve and the discharging reserve.

Total charging amount was calculated by combining the charging amount employed to charge the negative electrode before fabrication of the cell and the charging amount employed at limited charging formation. A relation between the total charging amount and overdischarge characteristics or cycle life characteristics was examined.

Activation Condition

Cells (nominal capacity: 1.1 AH) were fabricated using the positive electrode obtained in (i) and the negative electrodes F0–F50 obtained in (ii). The charging amount in Table 3 was applied to each of the cells after fabrication thereof.

Next the cells were charged at a nominal current of 0.1 C for 20 hours, and were discharged with a loading of resistance corresponding to a current of 1 C to the discharge ending potential of 0.8 V.

Experimental Condition (1) Overcharge Characteristics

The cells were charged at a current of 0.22 A continuously for 7 days (temperature: 0 ° C.).

(2) Cycle Life Characteristics

The cells were charged at a current of 0.11 A for 16 hours (temperature: room temperature), and were discharged with a loading of resistance corresponding to a current of 1.1 A to the discharge ending potential of 0.8 V (temperature: room temperature).

Result

1) A significant relation between the total charging amount and the cycle life characteristics or the overcharge characteristics was obtained, which will be described in detail with reference to Table 3.

As apparent from Table 3, when the total charging amount (charging formation before fabrication + limited charging formation after fabrication) was less than 5% (No. 1, 2, 8), the reduction of the cell capacity at the 10th cycle was significant. Also when the total charging amount was more than 30% (no. 3–5), hydrogen gas was generated at overcharging.

No significant reduction of the cell capacity nor generation of hydrogen gas was observed when the total charging amount was 5–30%. Thus, the preferable total charging amount was 5% or higher than the same as well as 30% or lower than the same.

Even with total charging amount of 5–30%, however, the cell capacity at the first cycle was significantly small unless the limited charging formation was applied thereto after fabrication. Thus, the limited charging formation after fabrication was indispensable for improvement of the cell capacity.

Further, charging amount employed at limited charging formation should be 1000 mAH/g or lower than the same, whereby coverage of the metallic cobalt particle with the cobalt oxyhydroxide barrier will be prevented.

The nickel-cadmium storage cell has been employed in this embodiment; however this may be replaced with other alkaline storage cells such as a nickel-hydrogen storage cell, a nickel-iron storage cell, and a nickel-zinc storage cell.

TABLE 3

| No. | 1) charging amount before fabrication | 2) charging amount after fabrication | total charging amount | hydrogen gas generation at overcharging | 3) cell capacity at 1st cycle | 4) cell capacity at 10th cycle | result |
|---|---|---|---|---|---|---|---|
| 1 | 0 | 0 | 0 | none | 100 | 91 | X |
|   |   | (0 mAh/g-Co) |   |   |   |   |   |
| 2 | 2 | 0 | 2 | none | 100 | 93 | X |
| 3 | 5 | 0 | 5 | none | 100 | 98 | X |
| 4 | 20 | 0 | 20 | none | 100 | 99 | X |
| 5 | 30 | 0 | 30 | none | 100 | 99 | X |
| 6 | 40 | 0 | 40 | gas | 100 | 100 | X |
| 7 | 50 | 0 | 50 | gas | 100 | 100 | X |
| 8 | 0 | 2 | 2 | none | 110 | 92 | X |
|   |   | (133 mAh/g-Co) |   |   |   |   |   |
| 9 | 5 | 2 | 7 | none | 110 | 98 | O |
| 10 | 0 | 5 | 5 | none | 111 | 99 | O |
|   |   | (333 mAh/g-Co) |   |   |   |   |   |
| 11 | 5 | 5 | 10 | none | 112 | 99 | O |
| 12 | 20 | 5 | 25 | none | 112 | 99 | O |
| 13 | 25 | 5 | 30 | none | 111 | 99 | O |
| 14 | 30 | 5 | 35 | gas | 111 | 99 | X |
| 15 | 40 | 5 | 45 | gas | 111 | 100 | X |
| 16 | 0 | 15 | 15 | none | 112 | 99 | O |
|   |   | (1000 mAh/g-Co) |   |   |   |   |   |
| 17 | 5 | 15 | 20 | none | 112 | 99 | O |
| 18 | 10 | 15 | 25 | none | 111 | 100 | O |
| 19 | 20 | 15 | 35 | gas | 112 | 100 | X |
| 20 | 30 | 15 | 45 | gas | 112 | 100 | X |

1) a ratio of charging amount before fabrication to theoretical capacity of negative electrode
2) a ratio of charging amount after fabrication to theoretical capacity of negative electrode
3) cell capacity of cell with 0% charging amount = 100
4) cell capacity of corresponding cell at 1st cycle = 100

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed:

1. A method for activating an alkaline storage cell which has never been charged and which comprises a non-sintered type nickel positive electrode comprised of a metallic cobalt powder, the method comprising:
charging the storage cell with an amount of 1000 mAH or lower per 1 g of the metallic cobalt powder included in the positive electrode;
resting the charged storage cell; and
conducting a conditioning operation comprising charging and discharging the storage cell which has been rested.

2. The activation method of claim 1, wherein the storage cell is rested until potential of the positive electrode becomes equivalent to an equilibrium potential of Co/Co (OH)$_2$.

3. The activation method of claim 1, wherein total charging amount is from 5% to 30% of theoretical capacity of a negative electrode, the total charging amount combining potential of the negative electrode included in the cell during fabrication and the amount charged to the cell during charging to the amount of 1000 mAH or lower.

4. A method for activating an alkaline storage cell comprising a non-sintered type nickel positive electrode comprised of a metallic cobalt powder, the method comprising:
repeating an activation cycle two or more times, the activation cycle comprising a sub step A and a sub step B, the sub step A including charging the fabricated storage cell with an amount of 1000 mAH or lower per 1 g of the metallic cobalt powder included in the positive electrode and the sub step B including resting the storage cell charged in the sub step A; and
conducting a conditioning operation comprising charging and discharging the storage cell which has been rested in the sub step B of a final activation cycle.

5. The activation method of claim 4, wherein in the sub step B, the storage cell is rested until potential of the positive electrode becomes equivalent to an equilibrium potential of Co/Co (OH)$_2$.

6. The activation method of claim 4, wherein total charging amount is 5% to 30% of theoretical capacity of an negative electrode, the total charging amount combining potential of the negative electrode included in the cell during fabrication and the amount charged to the cell at the sub step A of the activation cycle.

* * * * *